(12) United States Patent
Brittingham et al.

(10) Patent No.: US 7,686,581 B2
(45) Date of Patent: Mar. 30, 2010

(54) SERPENTINE COOLING CIRCUIT AND METHOD FOR COOLING TIP SHROUD

(75) Inventors: Robert Alan Brittingham, Piedmont, SC (US); John D. Ward, Woodruff, SC (US)

(73) Assignee: General Electric Company, Schenectady, NY (US)

( * ) Notice: Subject to any disclaimer, the term of this patent is extended or adjusted under 35 U.S.C. 154(b) by 330 days.

(21) Appl. No.: 11/447,910

(22) Filed: Jun. 7, 2006

(65) Prior Publication Data

US 2009/0304520 A1  Dec. 10, 2009

(51) Int. Cl.
 *F01D 5/18* (2006.01)
(52) U.S. Cl. ...................................... 416/97 R
(58) Field of Classification Search ................. 415/115, 415/116, 90 R, 92, 96 R, 97 R, 97 A; 416/90 R, 416/92, 96 R, 97 R, 97 A
 See application file for complete search history.

(56) References Cited

U.S. PATENT DOCUMENTS

| 4,127,358 | A | 11/1978 | Parkes |
| 4,940,388 | A | 7/1990 | Lilleker et al. |
| 5,460,486 | A | 10/1995 | Evans et al. |
| 5,482,435 | A | 1/1996 | Dorris et al. |
| 5,531,568 | A | 7/1996 | Broadhead |
| 5,785,496 | A | 7/1998 | Tomita |
| 6,099,253 | A | 8/2000 | Fukue et al. |
| 6,146,098 | A | 11/2000 | Fukuno et al. |
| 6,254,345 | B1 | 7/2001 | Harris et al. |
| 6,254,346 | B1 | 7/2001 | Fukuno et al. |
| 6,471,480 | B1 | 10/2002 | Balkcum |
| 6,499,950 | B2 | 12/2002 | Willett et al. |
| 6,506,022 | B2 | 1/2003 | Bunker |
| 6,761,534 | B1 * | 7/2004 | Willett ..................... 416/97 R |

FOREIGN PATENT DOCUMENTS

JP   03194101 A   *   8/1991

* cited by examiner

*Primary Examiner*—Edward Look
*Assistant Examiner*—Dwayne J White
(74) *Attorney, Agent, or Firm*—Nixon & Vanderhye, PC

(57) ABSTRACT

A serpentine cooling circuit is formed in a gas turbine blade to cool portions of the tip shroud, primarily the fillet between the airfoil and the tip shroud and the shroud edges.

18 Claims, 4 Drawing Sheets

SERPENTINE COOLING CIRCUIT AND METHOD FOR COOLING TIP SHROUD

BACKGROUND OF THE INVENTION

The present invention relates to a blade for a turbine, e.g. aircraft engine, gas turbine, steam turbine, etc. More specifically, the present invention relates to the cooling of a turbine blade tip shroud. As a non-limiting example the invention and its background are described with reference to a gas turbine.

A gas turbine is typically comprised of a compressor section that produces compressed air. Fuel is mixed with a portion of the compressed air and burned in one or more combustors, thereby producing hot compressed gas. The hot compressed gas is expanded in a turbine section to produce rotating shaft power. The turbine section is typically comprised of a plurality of alternating rows of stationary vanes (nozzles) and rotating blades (buckets). Each of the rotating blades has an airfoil portion and a root portion by which it is affixed to a rotor.

Since the blades are exposed to the hot gas discharged from the combustors, cooling methods are required to obtain a useful design life cycle. Traditionally, blade cooling is accomplished by extracting a portion of the compressed air from the compressor and directing it to the turbine section, thereby bypassing the combustors. After introduction into the turbine section, this cooling air flows through passages formed in the airfoil portions of the blades. Often, radial passages are provided that discharge the cooling air radially outwardly at the blade tip.

On many rotating airfoils, integral tip shrouds are used on the radially outer end of the blade to create an outer surface of the passage through which the hot gases must pass. Having the shroud as a part of the airfoil results in an increase in performance for the engine. As such, it is desirable for the entire outer surface to be covered by the tip shrouds. However, integral shrouds on rotating airfoils are highly stressed parts due to the mechanical forces applied via the rotational speed. The high temperature environment coupled with the high stresses makes it a challenge to design a shroud that will effectively perform over the entire useful life of the remainder of the blade. Two methods for resolving this challenge are to reduce the stress and/or reduce the temperature.

A common method for reducing the stress is to remove a portion of the overhanging shroud (scallop the shroud), thus reducing the load applied. Reducing the tip shroud coverage, however, results in a detriment to engine performance. In addition or in the alternative, cooling air discharging at the blade tip flows over the radially outward facing surface of the shroud so as to provide a measure of film cooling.

BRIEF DESCRIPTION OF THE INVENTION

The present invention proposes to more effectively cool the blade tip shroud by providing for serpentine cooling thereof, primarily at but not limited to the fillets between the airfoil and the tip shroud. The invention further provides a method of cooling a tip shroud using such a serpentine circuit.

Thus, the invention may be embodied in a turbine blade comprising a root portion for fixing said blade to a turbine rotor; an airfoil portion extending longitudinally from said root; at least one airfoil cooling passage extending through said airfoil, said airfoil cooling passage having an inlet for receiving a flow of cooling fluid; a shroud projecting outwardly from said airfoil and having a radially inward facing surface and a radially outward facing surface; and at least one serpentine cooling passage defined to extend back and forth through at least a portion of said shroud, said serpentine cooling passage being in flow communication with said airfoil cooling passage so as to receive cooling fluid therefrom and including at least one outlet opening for spent cooling fluid to exit the shroud, whereby at least a first portion of said cooling fluid received by said airfoil cooling passage through said inlet thereof flows into and through said serpentine cooling passage, and exits through said at least one outlet opening The invention may also be embodied in a turbine rotor having a row of turbine blades, at least one of said turbine blades comprising: a root portion for fixing said blade to said turbine rotor; an airfoil portion extending longitudinally from said root; at least one airfoil cooling passage extending through said airfoil, said airfoil cooling passage having an inlet for receiving a flow of cooling fluid; a shroud projecting outwardly from said airfoil and having a radially inward facing surface; and at least one serpentine cooling passage defined to extend back and forth through at least a portion of said shroud, said serpentine cooling passage being in flow communication with said airfoil cooling passage so as to receive cooling fluid therefrom and including at least one outlet opening for spent cooling fluid to exit the shroud, whereby at least a first portion of said cooling fluid received by said airfoil cooling passage through said inlet thereof flows into and through said serpentine cooling passage, and exits through said at least one outlet opening.

The invention may further be embodied in a method of cooling a gas turbine airfoil having an associated substantially planar shroud extending in a plane substantially perpendicular to the airfoil, the method comprising: a) providing at least one airfoil cooling passage in said airfoil; b) providing at least one serpentine cooling passage in said shroud that extends back and forth through at least a portion of said shroud; c) supplying cooling air to said at least one airfoil cooling passage; d) channeling said cooling air to said at least one serpentine cooling passage in said shroud; and e) passing said cooling air through said at least one serpentine cooling passage and out through said shroud.

BRIEF DESCRIPTION OF THE DRAWINGS

These and other objects and advantages of this invention will be more completely understood and appreciated by careful study of the following more detailed description of the presently preferred example embodiments of the invention taken in conjunction with the accompanying drawings, in which.

DETAILED DESCRIPTION OF THE INVENTION

Figure 1:
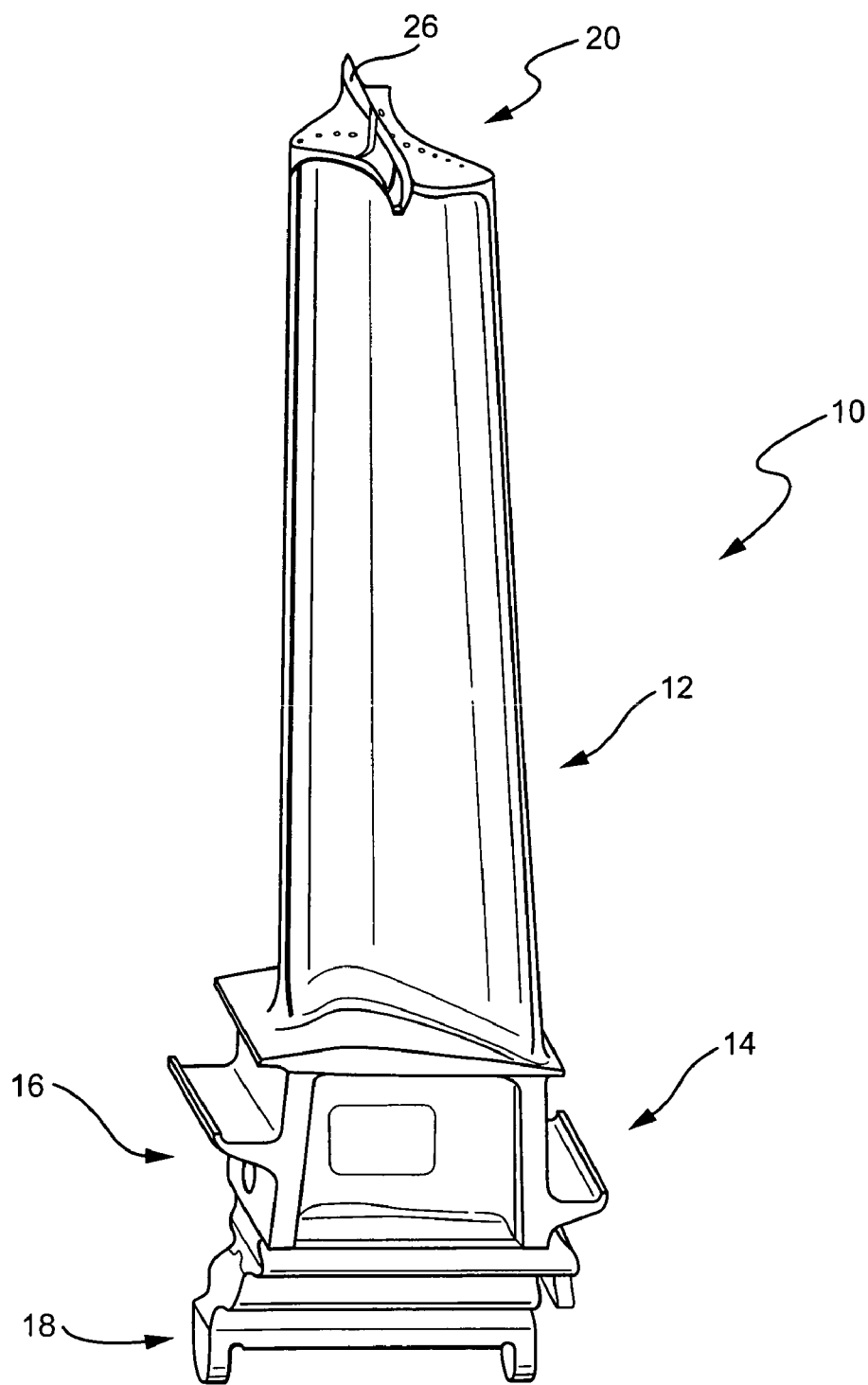
FIG. 1 is a schematic perspective view of a conventional turbine blade with tip shroud.

A typical blade with cooling passages exiting at the blade tip to flow over the tip shroud is schematically illustrated in FIG. 1. As schematically illustrated therein, each turbine blade 10 is comprised of an airfoil portion 12 and a root portion 14. The airfoil portion has a leading edge and a trailing edge. A generally concave surface and a generally convex suction surface extend between the leading and trailing edges on opposing sides of the airfoil. In the illustrated example, the blade root 14 is comprised of a shank 16 and a dovetail 18 to engage a corresponding dovetail groove on the rotor to secure the blade to the rotor.

Figure 2:
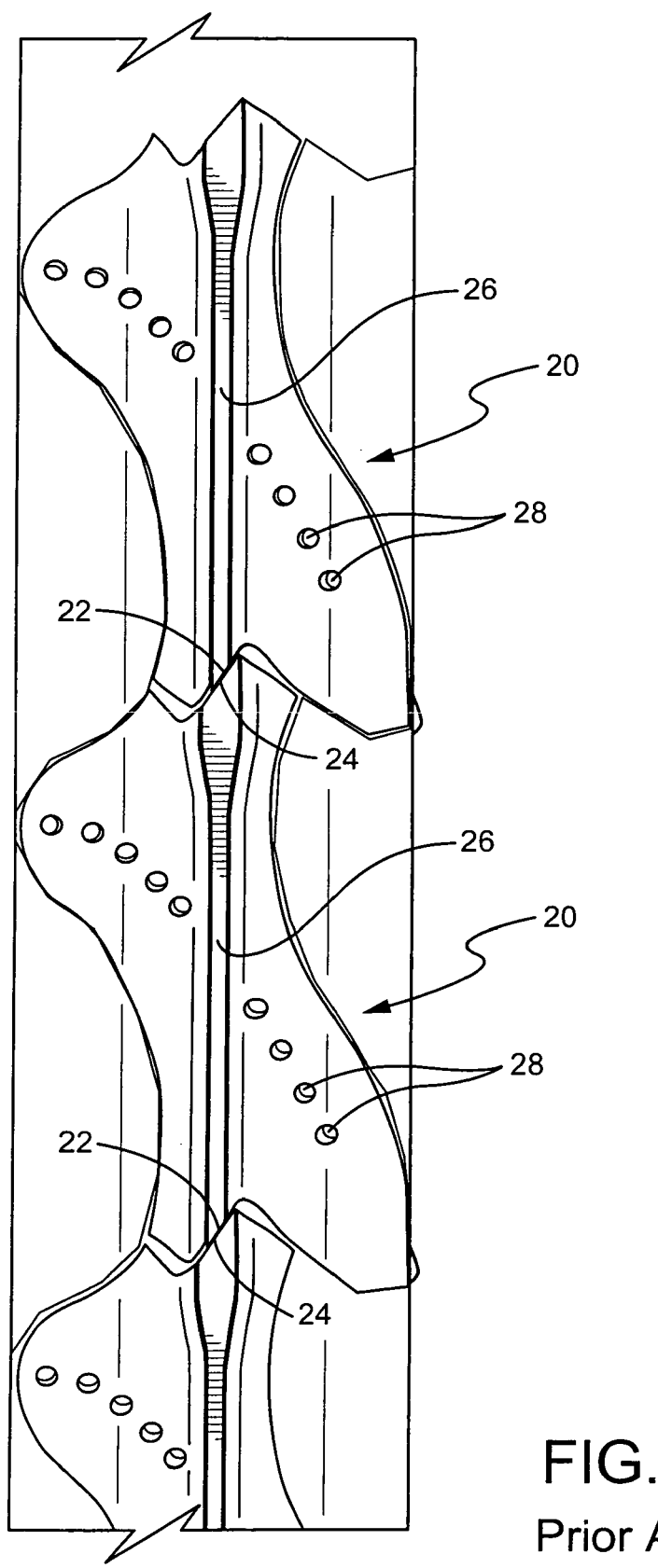
FIG. 2 is a schematic plan view of conventional tip shrouds, illustrating shroud scalloping.

As shown in FIGS. 1 and 2, a shroud 20 is formed at the tip of the airfoil 12 and extends outwardly from the airfoil. The shroud thus has radially inward and radially outward facing surfaces and is exposed to the hot compressed gas flowing through the turbine section. Each shroud has bearing surfaces 22,24 over which it contacts a shroud of an adjacent blade thereby restraining blade vibration. Furthermore, a baffle 26 typically extends radially outward from the shroud to prevent leakage of hot gas around the respective blade row. In some conventional bucket blade structures, a plurality of cooling air passages extend radially outwardly through the blade into the blade tip. In other conventional bucket blade structures serpentine passages are defined in the airfoil. As shown in FIG. 2, the cooling air passages (whether radial or serpentine), conventionally terminate at air discharge holes 28 that allow the cooling air to discharge at the radially outward surface of the shroud. Although nine holes 28 are illustrated in FIG. 2, more or fewer passages may be utilized.

Figure 3:
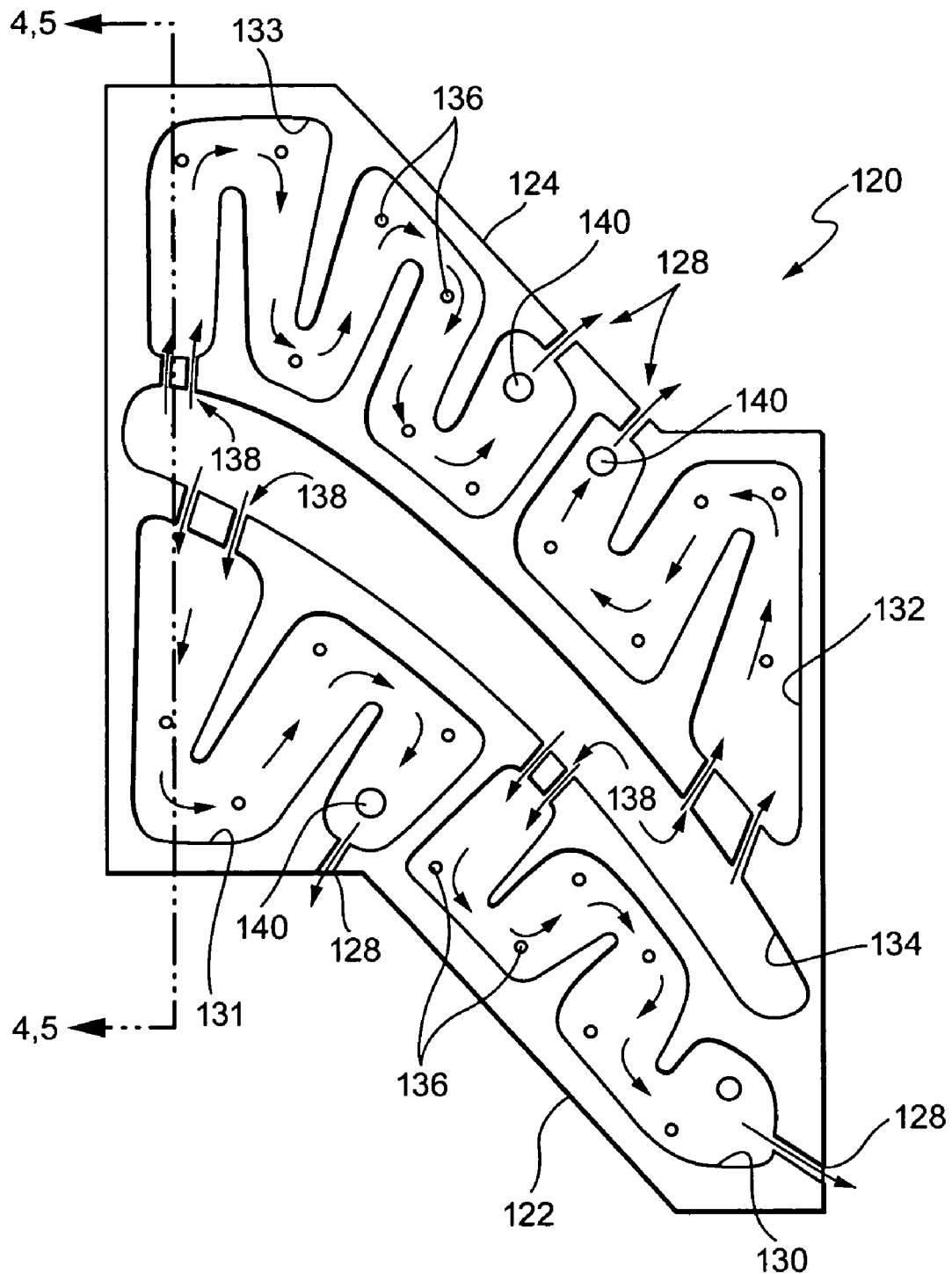
FIG. 3 is a schematic plan view of an embodiment of a serpentine cooled tip shroud embodying the invention.
Figure 4:
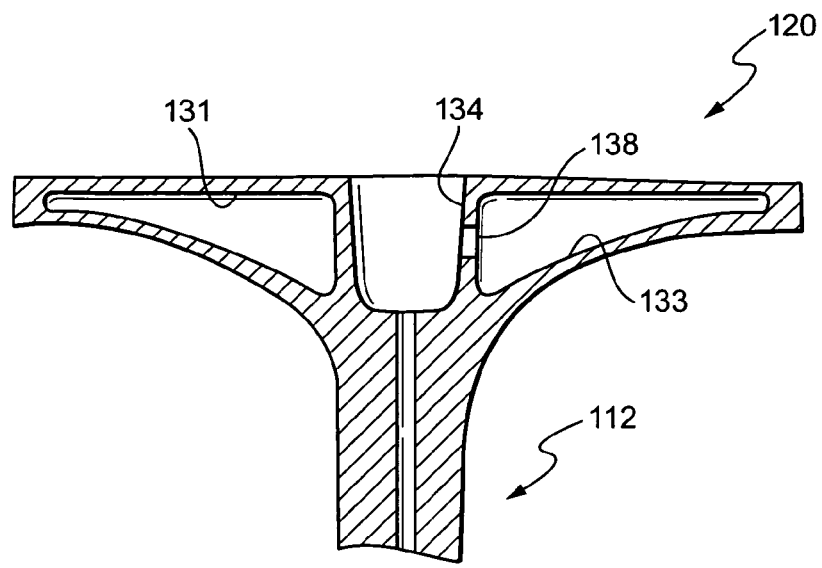
FIG. 4 is a schematic cross-sectional view of an example embodiment of the invention taken along line 4-4 of FIG. 3.
Figure 5:
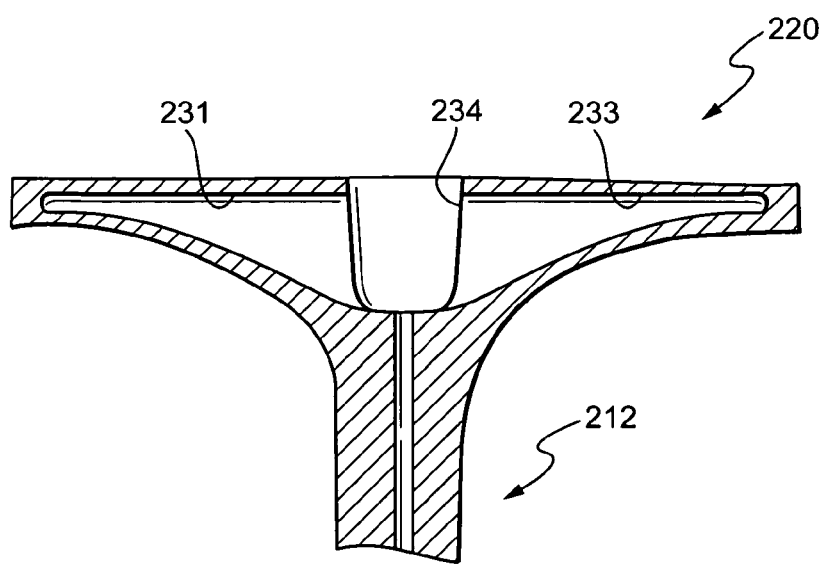
FIG. 5 is a schematic cross-sectional view of another example embodiment of the invention taken along line 4-4 of FIG. 3.

Referring to FIGS. 3-5, to provide more complete and effective cooling of the tip shroud, in an example embodiment of the invention, at least one serpentine circuit 130,131,132, 133,231,233 is formed inside the tip shroud 120,220. In a conventional manner, air is taken into the blade, e.g., near the dovetail or shank area, flows through the shank and into and along the airfoil toward the tip shroud 120. In the illustrated examples, a center chamber 134,234 is defined at the radial outer end of the airfoil 112,212 as a cooling fluid (air) reservoir for distribution through the shroud via the serpentine circuit(s). As an alternative, the plurality of passages extending along the airfoil may be respectively coupled to respective serpentine circuits within the shroud.

The cooling air flows from the coolant reservoir or the respective coolant passage(s) to and through the serpentine circuit(s). The serpentine circuits 130,131,132,133,231,233 may each have any number of back and forth passes where the coolant flows in a first direction and then turns and flows in another direction, which may be a diametrically opposite (180°) direction or at a lesser angle, such as 150° (30°) or 120° (60°). The cooling circuits in the tip shroud may have additional features inside the circuit such as turbulators or turning vanes, schematically shown at 136 to enhance heat transfer or reduce pressure loss. The serpentine circuits are disposed primarily in the plane of the tip shroud. Once the coolant has completed its traverse through the respective circuit, it exits through one or more apertures 128 from the shroud to the main gas path.

FIG. 3 (in conjunction with FIGS. 4 and 5) schematically illustrates an embodiment with four serpentine circuits 130, 131,132,133,231,233. Thus, as illustrated therein, the cooling medium flows from the airfoil into a tip shroud center chamber 134,234 which in turn supplies each of the four serpentine circuits. As noted above, the center chamber is not required and the cooling medium can flow directly from airfoil cooling passage(s) into any or all of the tip shroud serpentine circuits. Additionally, any number of center chambers could be used to supply any number of tip shroud serpentine circuits. However, a manufacturing convenience for blades that have airfoil cooling features that are formed after the blade is cast, is that the center chamber can be left open at the time of casting and sealed after the airfoil cooling features are formed, e.g., with an end plate/cap or simply by welding the opening shut without any end cap.

FIGS. 4 and 5 schematically illustrate two example cross-sections of the tip shroud of FIG. 3. In FIG. 4, holes 138 are provided for connecting the serpentine circuits to the center chamber. The holes may be used not only to simply connect the serpentine circuits to the center chamber, but may also be adapted to meter flow into the respective circuits. In the alternative configuration of FIG. 5, the center chamber is completely open to the serpentine circuits. Both the FIG. 4 and FIG. 5 embodiments may be defined by a common investment-casting core.

Features may be added to the serpentine circuit(s) to ease manufacture during the investment-casting phase of forming the blade. For example, the core may print out the top or edge of the part at the various points along the length of the serpentine circuit. Core print outs 140 would serve to strengthen the core during the process of forming the blade. They may be sealed after casting or left open, in which case they become bleed holes. Bleed holes would provide local convective cooling to the adjacent area but would reduce the amount of coolant downstream in the serpentine circuit which may or may not be an advantage from a heat transfer perspective.

In the event the airfoil incorporates serpentine circuits, the shroud serpentine circuits may be connected to the airfoil serpentine circuits. In a blade without serpentine cooling, for example, one that uses radial drilled cooling holes as mentioned above, the serpentine circuits of the shroud can be connected to a center chamber or directly to the radial cooling holes. Forming a center chamber is conducive to manufacturing the radial cooling holes, but must be sealed prior to use. Alternatively, the serpentine circuits of the shroud may be cast in the part and radial holes drilled through the part to intersect those serpentine circuits. The top of the drilled through hole may then be sealed to force the coolant to pass through the serpentine circuit(s) before exiting the shroud. As an additional feature, the spent cooling air exiting from the serpentine circuits may be advantageously located for further cooling optimization. For example, the exit(s) to the serpentine circuit(s) may be disposed to cool the interface 122,124 between adjacent blade tip shrouds.

A benefit of a serpentine cooled tip shroud according to example embodiments of the invention is that the weight of the blade is reduced accordingly. In this regard, for heat transfer purposes, the velocity of the shroud coolant air should be kept reasonably high. For blades with low coolant flows and hollow tip shrouds, this is primarily accomplished by reducing the size of the channels in which the coolant flows. This results in more shroud metal or a smaller overall shroud. In general more shroud metal results in greater bucket weight, whereas a smaller overall shroud, i.e. scalloped shroud, results in lower engine performance. Providing serpentine circuit(s) as described herein allows a small amount of cooling air to pass through relatively small channels a number of times. This maintains coolant velocity while increasing the volume of air inside the tip shroud and reducing blade weight as compared to a solid tip having a similar amount of scalloping.

Finally, providing serpentine circuit(s) that are integral to the part, i.e., cast in, provides significant benefits to the structural integrity of the part. Indeed, no process would be required to create a joint between the tip shroud and the main body of the blade. Such joints are difficult to inspect to ensure mechanical integrity for the useful life of the balance of the blade.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. For example, while reference has been made in particular to the cooling of a tip shroud, the technology disclosed herein could be used on a shroud that is not located at the tip of the blade. In this regard, some blades have shrouds about mid-length of the airfoil that connect it to its adjacent blade, and the cooling passages described hereinabove could be incorporated therein.

What is claimed is:

1. A turbine blade comprising:
   a root portion for fixing said blade to a turbine rotor;
   an airfoil portion extending longitudinally from said root;
   at least one airfoil cooling passage extending through said airfoil, said airfoil cooling passage having an inlet for receiving a flow of cooling fluid;
   a shroud projecting outwardly from said airfoil and having a radially inward facing surface and a radially outward facing surface; and
   at least one serpentine cooling passage defined to extend back and forth through at least a portion of said shroud, said serpentine cooling passage being in flow communication with said airfoil cooling passage so as to receive cooling fluid therefrom and including at least one outlet opening for spent cooling fluid to exit the shroud,
   whereby at least a first portion of said cooling fluid received by said airfoil cooling passage through said inlet thereof flows into and through said serpentine cooling passage, and exits through said at least one outlet opening,
   wherein said shroud includes at least one center cooling chamber, said center cooling chamber being in flow communication with said at least one airfoil cooling passage and being in flow communication with said at least one serpentine cooling passage.

2. A turbine blade as in claim 1, wherein said shroud has a bearing surface for engaging a shroud of an adjacent blade.

3. A turbine blade as in claim 2, wherein at least one said outlet opening is disposed adjacent said bearing surface.

4. A turbine blade as in claim 1, wherein said airfoil has leading and trailing edges and generally convex and concave surfaces extending from said leading edge to said trailing edge, and wherein a first portion of said shroud projects outwardly from said convex surface and a second portion of said shroud projects outwardly from said concave surface.

5. A turbine blade as in claim 1, wherein said center cooling chamber is in flow communication with said at least one serpentine cooling passage via at least one flow opening in a partition wall therebetween.

6. A turbine blade as in claim 1, wherein said center cooling chamber is in open flow communication with said at least one serpentine cooling passage.

7. A turbine blade as in claim 1, wherein there are a plurality of serpentine cooling passages defined in said shroud.

8. A turbine blade as in claim 7, wherein there are four serpentine cooling passages defined in said shroud.

9. A turbine rotor having a row of turbine blades, at least one of said turbine blades comprising:
   a root portion for fixing said blade to said turbine rotor;
   an airfoil portion extending longitudinally from said root;
   at least one airfoil cooling passage extending through said airfoil, said airfoil cooling passage having an inlet for receiving a flow of cooling fluid;
   a shroud projecting outwardly from said airfoil and having a radially inward facing surface; and
   at least one serpentine cooling passage defined to extend back and forth through at least a portion of said shroud, said serpentine cooling passage being in flow communication with said airfoil cooling passage so as to receive cooling fluid therefrom and including at least one outlet opening for spent cooling fluid to exit the shroud,
   whereby at least a first portion of said cooling fluid received by said airfoil cooling passage through said inlet thereof flows into and through said serpentine cooling passage, and exits through said at least one outlet opening,
   wherein said shroud includes at least one center cooling chamber, said center cooling chamber being in flow communication with said at least one airfoil cooling passage and being in flow communication with said at least one serpentine cooling passage.

10. A turbine rotor as in claim 9, wherein said shroud has a bearing surface for engaging a shroud of an adjacent blade in said row of turbine blades.

11. A turbine rotor as in claim 10, wherein at least one said outlet opening is disposed adjacent said bearing surface.

12. A turbine rotor as in claim 9, wherein said center cooling chamber is in flow communication with said at least one serpentine cooling passage via at least one flow opening in a partition wall therebetween.

13. A turbine rotor as in claim 9, wherein said center cooling chamber is in open flow communication with said at least one serpentine cooling passage.

14. A turbine rotor as in claim 9, wherein there are a plurality of serpentine cooling passages defined in said shroud.

15. A turbine rotor as in claim 14, wherein there are four serpentine cooling passages defined in said shroud.

16. A method of cooling a gas turbine airfoil having an associated substantially planar shroud extending in a plane substantially perpendicular to the airfoil, the method comprising:
   a) providing at least one airfoil cooling passage in said airfoil;
   b) providing at least one center cooling chamber in said shroud;
   c) providing at least one serpentine cooling passage in said shroud that extends back and forth through at least a portion of said shroud;
   d) supplying cooling air to said at least one airfoil cooling passage;
   e) channeling said cooling air to said at least one serpentine cooling passage in said shroud; and
   f) passing said cooling air through said at least one serpentine cooling passage and out through said shroud,
   wherein said center cooling chamber is in flow communication with said at least one airfoil cooling passage and is in flow communication with said at least one serpentine cooling passage.

17. The method of claim 16, wherein the at least one serpentine cooling passage is investment cast when the airfoil is formed.

18. The method of claim 16 wherein step f) is carried out by providing at least one cooling air exhaust hole in said shroud, opening at a peripheral edge of the shroud.

* * * * *